Patented Nov. 27, 1945

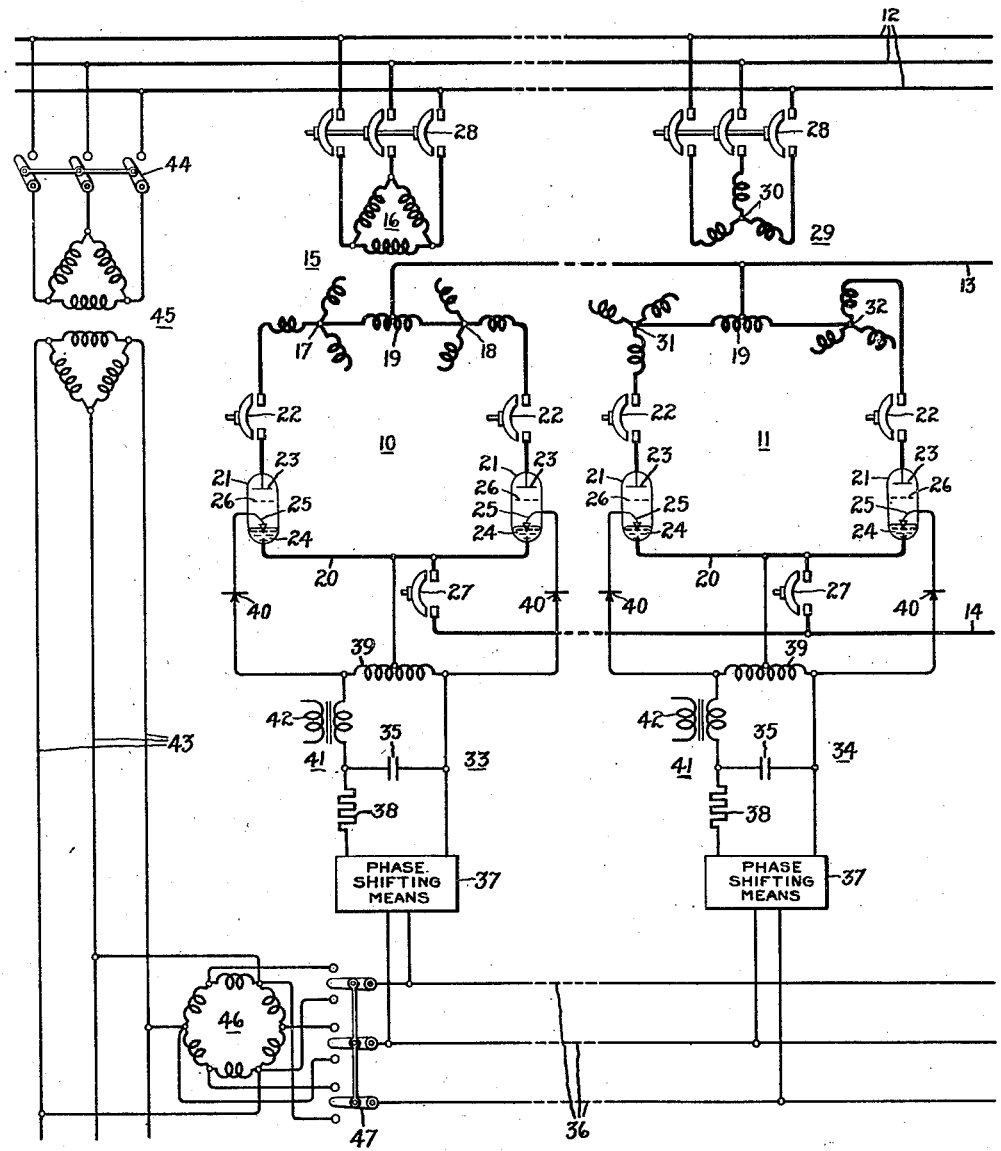

2,389,889

UNITED STATES PATENT OFFICE 2,389,889

ELECTRIC VALVE TRANSLATING APPARATUS AND A METHOD OF OPERATING THE SAME

Burnice D. Bedford, Schenectady, N. Y., assignor to General Electric Company, a corporation of New York Application July 27, 1943, Serial No. 496,358

4 Claims. (Cl. 315—195)

My invention relates to electric valve translating apparatus and more particularly to improved control or excitation circuits for electric valve translating apparatus and a method of operating the same.

Electric valve systems employing a number of units operating in parallel have been widely used as a power supply for electrolytic processes requiring currents of large magnitudes. Some difficulty has been experienced in placing apparatus of this character in operation due to failure of all of the electric valves of the apparatus to become conductive at the intended time. The electric valves which conduct first temporarily assume all of the load which, in many cases, is sufficient to operate the protective equipment and isolate the overloaded units. In installations employing electric valve means having starting electrodes of the make-alive type, at least a part of the discrepancy in starting time among the various parallel units has been found to result from failure of the starting electrodes to form a cathode spot for the first cycle or first several cycles that they are energized. In accordance with the teachings of my invention, I provide an improved circuit for energizing the control members of electric valve apparatus of the above type which insures that the electric valves are all in a condition to assume load at the instant the apparatus is placed in operation.

It is an object of my invention to provide a new and improved electric control circuit.

It is another object of my invention to provide new and improved excitation or control cricuits for electric valve translating apparatus.

It is still another object of my invention to provide a new and improved electric control circuit for energizing the control electrodes of a plurality of electric valve units operating in parallel and to provide an improved method of placing such apparatus in operation.

In accordance with the illustrated embodiment of my invention, I provide a circuit for energizing the make-alive type of electrodes of a plurality of electric valve units operating in parallel with voltage peaks which occur during the intervals that the anodes of the electric valves are negative to heat the control electrodes and insure that they are in condition to form a cathode spot upon the transmission of each impulse of current thereto. In accordance with the method of the present invention, the electric valve units are next connected between the supply and load circuits and finally the excitation voltage is suddenly shifted into the region of positive anode voltage to render the electric valve units conductive.

My invention will be better understood by reference to the following description taken in connection with the accompanying drawing and its scope will be pointed out in the appended claims. In the drawing, the single figure illustrates schematically one embodiment of my invention.

In the arrangement shown in the drawing, a pair of electric valve rectifying units 10 and 11 are shown connected in parallel between a three-phase alternating-current supply circuit 12 and a direct-current load circuit comprising conductors 13 and 14. It will be understood that the present invention is particularly adapted for use in connection with systems employing a large number of rectifier units in parallel but, in order to simplify the drawing, only two of the units have been illustrated. The rectifier unit 10 comprises a supply transformer 15 having a delta-connected primary winding 16 and double-Y secondary windings 17 and 18 having the neutrals thereof interconnected by an interphase transformer 19, the midterminal of which is connected to the direct-current line 13. Each of the phase terminals of the windings 17 and 18 are connected to a cathode bus 20 through the anode-cathode circuit of an electric valve means 21 and the contacts of a high-speed anode breaker illustrated schematically at 22. The electric valve means are of the type employing an ionizable medium, such as a gas or vapor, and each includes an anode 23, a cathode, such as a pool of mercury 24, and a make-alike type starting electrode 25. The valves 21 may also include a control member or grid 26. The cathode bus 20 of the rectifying unit 10 is connected to the direct-current line 14 through the contacts of a cathode breaker 27. The primary winding 16 of the supply transformer is connected with the alternating-current supply circuit through the contacts of the alternating-current circuit breaker 28. Electric valve rectifying unit 11 is in general the same as the electric valve rectifying unit 10 except that the voltages impressed on the anode-cathode circuits of the electric valves thereof are displaced in phase with respect to the voltages of the unit 10 by the supply transformer 29 which includes a Y-connected primary winding 30 and electrically displaced secondary windings 31 and 32. The remainder of the unit 11 is of the same arrangement as the unit 10 and the same reference numerals have been employed to designate corresponding parts. Only two electric valves have been illustrated in connection with the units 10 and 11 in order to simplify the drawing. It will be understood that a similar electric valve and circuit breaker interconnect each of the phase terminals of the transformer secondary windings and the respective cathode buses 20.

In order to energize the starting electrodes 25 with periodic voltages of peaked wave form, I have illustrated static impulsing circuits of the type described and claimed in the copending application of Alexanderson and Mittag, Serial No. 374,716, filed January 16, 1941, entitled Electric control circuits, and assigned to the same assignee as the present application. As illustrated, each of the excitation circuits 33 and 34 comprises a capacitance 35 which is arranged to be charged from one phase of an alternating-current excitation bus 36 through suitable phase-shifting means 37 and a stabilizing or damping resistor 38. The discharge circuit for the capacitance includes an autotransformer 39 having a midtap connected with the cathode bus 20 and with the end terminals connected with the control electrodes 25 of electric valve means 21 associated with phase terminals of the supply transformer windings which are electrically displaced 180 electrical degrees. The circuit of each of the control electrodes preferably includes a unilaterally conducting device 40 to prevent reverse current from traversing the control electrode. The discharge of the capacitance through the autotransformer 39 and the control-electrode-to-cathode circuits of the electric valves 21 is controlled by a self-saturating reactor 41 connected in the discharge circuit of the capacitor 35. The reactor 41 is of the self-saturating type and the impedance thereof reduces abruptly at a predetermined point in the voltage wave impressed thereon by capacitor 35, thus producing symmetrical voltage peaks across the autotransformer 39 during both positive and negative half cycles. A unidirectional winding 42 may be provided and energized from a suitable source of direct current, not shown, to shift the phase displacement between the positive and negative impulses of voltage produced by the excitation circuit.

The excitation bus 36 is energized from the alternating-current supply circuit 12 through an auxiliary alternating-current bus 43 which may be employed for energizing the various electrical auxiliaries required in the operation of the rectifier equipment. The bus 43 is energized from circuit 12 through a switch 44 and the transformer 45. The excitation bus 36 is energized from the auxiliary bus 43 through a phase-shifting autotransformer 46 and a three-pole reversing switch 47. The autotransformer 46 is provided with terminals for producing two three-phase systems of voltages displaced with respect to each other by 180 electrical degrees and the switch 47 is arranged to energize selectively the bus 36 in accordance with one of the systems of voltages.

In the operation of the system described above in accordance with the present invention, the switch 44 is closed and the switch 47 is moved to its upper position which, it will be assumed, energizes the bus 36 with a system of voltages such that the current impulses transmitted to the starting electrodes 25 occur during the half cycles of negative anode voltage of the electric valves. All of the power breakers 22, 27 and 28 are closed. Then by moving switch 47 to its lower position, the phase position of the current impulses supplied to the control electrodes 25 will be reversed and the cathode spots will be formed during the positive half cycles of anode-cathode voltages so that the electric valves will all be rendered conductive at the first current impulse which is transmitted to the associated control electrode after switch 47 is moved to its lower position.

From the foregoing description of the apparatus illustrated embodiment and method of operation thereof, it is apparent that the starting electrode may be brought to operating temperature by supplying current impulses thereto during the negative half cycles of anode-cathode voltage and that conduction of all of the electric valves may then be initiated by simply reversing the position of a single switch. It will be apparent that the power breakers may be closed prior to the energization of the control electrodes. In the drawing the electric valves have been illustrated as provided with control members or grids 26. During normal operation, these control members may be energized with an alternating voltage which aids in the propagation of the arc from the cathode to the anode, and if desired these control members may initially be energized with a negative voltage which is removed concurrently with the movement of the switch 47 to its lower position to initiate operation of the electric valve system.

While I have shown and described a particular embodiment of my invention, it will be obvious to those skilled in the art that changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, a supply circuit, a load circuit, at least one of said circuits being an alternating-current circuit, electric valve translating apparatus interconnecting said circuits including a plurality of electric valve units arranged to operate in parallel, each of said units comprising electric valve means including an anode, a cathode, and a starting electrode of the make-alive type, excitation circuits associated with said starting electrodes for supplying electrical impulses to said electrodes at the periodicity of said alternating-current circuit, means for energizing said excitation circuits with alternating voltages having such a phase relation with respect to the anode-cathode voltages of said electric valve means that said starting electrodes are energized during the interval that the associated anodes are negative with respect to the associated cathodes, and means for shifting abruptly the phase of the voltage impressed on all said excitation circuits to render said electric valve means conductive.

2. In combination, a supply circuit, a load circuit, at least one of said circuits being an alternating-current circuit, electric valve translating apparatus interconnecting said circuits including a plurality of electric valve units connected to operate in parallel, each of said units comprising electric valve means including an anode, a cathode, and a starting electrode of the make-alive type, excitation circuits associated with said starting electrodes for supplying electrical impulses to said electrodes at the periodicity of said alternating current circuit, means for energizing said excitation circuits with alternating voltages having such a phase relation with respect to the anode-cathode voltages of said electric valve means that said impulses are transmitted to said starting electrodes during the interval that the associated anodes are negative with respect to the associated cathodes, and means for simultaneously reversing the phase of the voltage impressed on all said excitation circuits to shift said impulses to the region of positive anode voltage and thereby to render said electric valve means conducting.

3. In combination, a supply circuit, a load circuit, at least one of said circuits being an alternating-current circuit, electric valve translating apparatus interconnecting said circuits including a plurality of electric valve units operating in parallel, each of said units comprising electric valve means including an anode, a cathode, and a starting electrode of the make-alive type, excitation circuits associated with said starting electrodes for supplying electrical impulses to said electrodes at the periodicity of said alternating-current circuit, an excitation bus energized from said alternating-current circuit for energizing said excitation circuits with alternating voltages having such a phase relation with respect to the anode-cathode voltages of said electric valve means that said starting electrodes are energized during the interval that the associated anodes are negative with respect to the associated cathodes, and a single switching means for altering the connections between said alternating-current circuit and said excitation bus to shift abruptly the phase of the voltages impressed on said excitation circuits to render said electric valve means conducting.

4. The method of initiating operation of a plurality of electric valve units in parallel between an alternating-current circuit and a direct-current circuit, each of said units including electric valve means having starting electrodes of the make-alive type, which comprises the steps of completing the power connections between said circuits and said valve units, supplying excitation voltages to said starting electrodes only during the intervals of negative anode voltage to transmit current impulses thereto to heat said starting electrodes without initiating conduction of the valve means, and thereafter shifting the excitation voltages into the region of positive anode voltage to initiate conduction of said valve means.

BURNICE D. BEDFORD.